(12) United States Patent
Huh et al.

(10) Patent No.: US 10,442,434 B2
(45) Date of Patent: Oct. 15, 2019

(54) CONTROL METHOD FOR COASTING OF ECO-FRIENDLY VEHICLE

(71) Applicants: HYUNDAI MOTOR COMPANY, Seoul (KR); KIA MOTORS CORPORATION, Seoul (KR)

(72) Inventors: Jee Wook Huh, Bucheon-si (KR); Dong Jin Sohn, Pyeongtaek-si (KR); Do Hee Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 10 days.

(21) Appl. No.: 15/838,006

(22) Filed: Dec. 11, 2017

(65) Prior Publication Data

US 2019/0001984 A1 Jan. 3, 2019

(30) Foreign Application Priority Data

Jun. 28, 2017 (KR) .......................... 10-2017-0081643

(51) Int. Cl.
*B60W 30/18* (2012.01)
*B60W 20/00* (2016.01)

(52) U.S. Cl.
CPC ...... *B60W 30/18072* (2013.01); *B60W 20/00* (2013.01); *B60W 2540/12* (2013.01); *B60W 2550/142* (2013.01); *B60W 2710/083* (2013.01); *B60W 2720/10* (2013.01); *B60Y 2200/92* (2013.01); *B60Y 2300/181* (2013.01); *B60Y 2300/18066* (2013.01);

(Continued)

(58) Field of Classification Search
CPC ............ B60W 20/00; B60W 2540/12; B60W 2550/142; B60W 2710/083; B60W 2720/10; B60W 30/18072; B60Y 2200/92; B60Y 2300/18066; B60Y 2300/181; B60Y 2300/18125; B60Y 2300/91; Y10S 903/93
See application file for complete search history.

(56) References Cited

U.S. PATENT DOCUMENTS

| | | | |
|---|---|---|---|
| 6,024,673 A * | 2/2000 | Hayashi | F16D 48/066 192/13 R |
| 2004/0098181 A1* | 5/2004 | Henneken | F16H 61/16 701/51 |

(Continued)

*Primary Examiner* — Tyler J Lee
(74) *Attorney, Agent, or Firm* — Morgan, Lewis & Bockius LLP

(57) ABSTRACT

A coasting control method of an eco-friendly vehicle includes steps of acquiring deceleration event information and road gradient information in front of a vehicle during driving, by a controller in the vehicle, determining target vehicle speed in a deceleration event in consideration of road gradient based on the deceleration event information and the road gradient information, by the controller, determining expected vehicle speed while the vehicle is decelerated in a coasting state, based on current vehicle speed, by the controller, determining a start location for starting coasting based on target vehicle speed in consideration of current vehicle speed of the vehicle and the road gradient and expected vehicle speed at a target location as a deceleration event location, by the controller, and operating an information provider for coasting guidance and coasting induction to a driver at a start location, by the controller.

20 Claims, 2 Drawing Sheets

(52) U.S. Cl.
CPC . *B60Y 2300/18125* (2013.01); *B60Y 2300/91* (2013.01); *Y10S 903/93* (2013.01)

(56) References Cited

U.S. PATENT DOCUMENTS

| | | | | |
|---|---|---|---|---|
| 2009/0216415 A1* | 8/2009 | Iwatsuki | ............. | B60W 30/188 701/70 |
| 2011/0066342 A1* | 3/2011 | Ozaki | ..................... | B60T 7/042 701/70 |
| 2013/0041534 A1* | 2/2013 | Kim | ..................... | B60W 10/08 701/22 |
| 2015/0011360 A1* | 1/2015 | Sano | ..................... | F02D 29/02 477/203 |

\* cited by examiner

CONTROL METHOD FOR COASTING OF ECO-FRIENDLY VEHICLE

CROSS-REFERENCE TO RELATED APPLICATION

This application is based on and claims under 35 U.S.C. § 119(a) the benefit of priority to Korean Patent Application No. 10-2017-0081643 filed on Jun. 28, 2017 with the Korean Intellectual Property Office, the entire contents of which are incorporated herein by reference.

TECHNICAL FIELD

The present disclosure relates to a coasting control method of an eco-friendly vehicle. More particularly, it relates to a coasting control method of an eco-friendly vehicle, for simplifying a vehicle control logic for coasting and coasting guidance, making map data to ease mapping and writing, and enhancing the accuracy, reliability, and efficiency of control.

BACKGROUND

An eco-friendly vehicle is known as a vehicle that produces little or no pollutant compared with an internal combustion engine (ICE) vehicle that uses fossil fuel such as gasoline or diesel.

Recently, eco-friendly vehicles have received considerable attention due to issues of energy depletion and environmental pollution, and have already been commercialized or are about to be commercialized.

Most eco-friendly vehicles have been developed in the form of a vehicle that is driven by electric power, that is, a vehicle driven by using power of an electric motor.

Representative examples of the eco-friendly vehicle include a pure electric vehicle (EV) that is driven by operating a motor using power stored in a battery, a hybrid electric vehicle (HEV) that is driven using an engine (internal combustion engine) and a motor, and a fuel cell electric vehicle (FCEV) that is driven by operating a motor using power generated from a fuel cell.

Among above, an HEV refers to a vehicle that is driven by an engine for combusting fuel to generate driving force and a motor for generating driving force using electric energy of a battery and is known as a plug-in hybrid electric vehicle (PHEV) for charging a battery by inserting a plug into an electric outlet, a general HEV that does not perform this operation, and so on.

In addition, an HEV has been known to be configured with a power train using a transmission mounted electric device (TMED) in which a motor (driving motor) and a transmission are attached.

The HEV equipped with the TMED includes an engine and a motor as a driving source for vehicle driving, an engine clutch interposed between the engine and the motor, a transmission connected to an output side of the motor, an inverter for operating the motor, and a battery connected to the motor to be recharged or discharged through the inverter as a power source of the motor and is configured in such a way that the transmission is installed at the output side of the motor and the output side of the motor is connected to an input side of the transmission.

In addition, the HEV equipped with the TMED includes a motor connected to the engine for power transmission to turn on the engine or for generating power using rotation force transmitted from the engine, that is, a hybrid starter generator (HSG).

Among the above components, the engine clutch connects the engine and the motor to transmit power or disconnects the engine and the motor, and the inverter converts direct current (DC) of the battery into 3-phase alternating current (AC) and applies the converted current to the motor to drive the HSG of the motor.

The HEV including the above components is capable of being driven in an electric vehicle (EV) mode as a pure electric vehicle mode that uses only power of the motor, or a hybrid electric vehicle (HEV) that uses power of the engine and power of the motor in a multiple manner.

An eco-friendly vehicle such as an electric vehicle (EV) and a fuel cell electric vehicle (FCEV), which use a motor as a vehicle driving source, as well as a hybrid electric vehicle (HEV or PHEV) may execute a regenerative mode of charging a battery using a motor as a generator.

In other words, kinetic energy of a vehicle is converted into electric energy and is recovered during vehicle braking using brake equipment or during coasting in which a vehicle is driven using inertia.

In the regenerative mode, a motor that receives kinetic energy of a vehicle operates as a generator to recharge a battery connected to the motor through an inverter and, in this case, energy is capable of being recovered by the motor, thereby enhancing vehicle fuel efficiency.

In particular, when a deceleration event, for example an interchange (IC) or junction (JC), an intersection, a speed limit road, a curved road, a traffic light, a U-turn point, a left turn point, a right turn point, a tollgate, and destination, occurs in front of a road on which a vehicle is currently driven, the vehicle needs to be decelerated. When a driver pre-recognizes such a deceleration event and maintains an accelerator pedal and a brake pedal to be released at a time point requiring deceleration of the vehicle, the vehicle is driven using inertia (or coasting). In this case, it is possible to recover energy via coasting control, i.e., motor control for enabling a generation operation.

When a driver maintains brake pedal and acceleration pedal in an off state for deceleration in an eco-friendly vehicle, coasting of the vehicle is performed and, in this case, the vehicle is decelerated via control of torque (which is negative torque) of a motor without vehicle braking by brake equipment, and energy recovered by the motor is simultaneously stored in the battery.

Here, pedal off refers to a state in which a driver does not manipulate a corresponding pedal, that is, a state in which the driver takes their foot off the pedal (the pedal is released) and, on the other hand, pedal on refers to a state in which a driver pushes and manipulates a corresponding pedal.

Vehicle deceleration during coasting is similar to regenerative braking performed by pushing a brake pedal by a driver in that a battery is recharged via a motor. However, the vehicle deceleration during coasting is different from the regenerative braking in that regenerative braking is performed via braking force distribution into friction braking force by brake equipment and regenerative braking force (electric braking force) by a motor, while the vehicle deceleration during coasting is performed via only vehicle driving resistance and a motor without friction braking.

As such, an eco-friendly vehicle recovers vehicle energy as electric energy using a motor during braking or coasting, stores the recovered electric energy in a battery, and reuses the electric energy to drive the motor to increase driving distance and fuel efficiency of the vehicle, thereby effectively using energy.

Some hybrid electric vehicles that have been recently commercialized have a coasting guidance function of guiding and inducing coasting of a driver at an appropriate time when a deceleration event occurs in front of the vehicle.

The coasting guidance function is a function of operating an indicator, etc. of a cluster to induce coasting of a driver at a time when a vehicle is capable of being decelerated to target vehicle speed via coasting.

When a driver checks that coasting is possible via an indicator, etc., an accelerator pedal and a brake pedal are maintained in an off state to decelerate a vehicle to target vehicle speed at a target location of the deceleration event in a coasting state and, simultaneously, to recover energy by the motor during the coasting.

In general, most drivers take their foot off an accelerator pedal and push a brake pedal to decelerate the vehicle via brake equipment (friction braking equipment) when a deceleration event occurs in front of the vehicle.

In this case, the driver determines a time when their foot is taken off the accelerator pedal and a time when the brake pedal is pushed, with the naked eye and, in this case, actually, most drivers slowly take their foot off the accelerator pedal compared with a time corresponding to appropriate accelerator pedal off and, then, quickly manipulate the brake pedal to decelerate the vehicle and, accordingly, this may be very disadvantageous in terms of driving distance and fuel efficiency compared with the case in which a deceleration effect is obtained via only coasting.

On the other hand, an eco-friendly vehicle such as an electric vehicle, a hybrid electric vehicle, and a fuel cell vehicle is capable of performing torque control on a motor for driving a vehicle, that is, a driving motor and, thus, may achieve a similar deceleration effect of an internal combustion engine (ICE) vehicle using an automatic transmission via torque control (coasting motor torque control) of a driving motor during coasting.

The vehicle is smoothly decelerated to target vehicle speed while recovering maximum energy without brake manipulation via motor torque control only when a driver pre-recognizes a front deceleration event with the naked eye and, then, takes their foot off an accelerator pedal without manipulation of a brake pedal at an appropriate time.

When a vehicle is decelerated by manipulating a brake pedal rather than being decelerated via only coasting, friction braking using a brake and regenerative braking using a motor are distributed to ensure total braking force and, accordingly, it is possible to recover energy only when distributed regenerative braking is limited, which is disadvantageous in terms of enhancement in driving distance and fuel efficiency.

Accordingly, it is advantageous to decelerate a vehicle via only coasting without manipulation of a brake if possible to decelerate the vehicle to target vehicle speed from current speed and, to this end, it is important to guide a driver to take their foot off an accelerator pedal to cause coasting at an appropriate time.

In the case of an eco-friendly vehicle, it is possible to adjust deceleration force of the vehicle using a driving motor during coasting. Thus, when a driver drives the vehicle in an accelerator pedal and brake pedal off state via coasting, the vehicle is decelerated to target vehicle speed at a desired location by adjusting deceleration force using the driving motor while using friction force of the vehicle without manipulation of brake equipment. Accordingly, this is advantageous in terms of enhancement in driving distance and fuel efficiency compared with the case in which the accelerator pedal is slowly released at an appropriate time to brake the vehicle using brake equipment.

Replacement frequency of brake equipment is advantageously increased.

As such, in the case of an eco-friendly vehicle, when the vehicle is decelerated to target vehicle speed from current vehicle speed, it is advantageous in that vehicle deceleration via coasting is maximally used without manipulation of a brake to enhance driving distance and fuel efficiency.

To this end, there is a need for a coasting guidance and induction function of guiding drivers to take their foot off an accelerator pedal at an appropriate time.

However, a conventional coasting guidance function is mainly concentrated on determining expected vehicle speed to a target location of a deceleration event location from a current vehicle location and a start time of coasting based on a current vehicle state, a road condition, and so on, and guiding a driver to start coasting at the determined start time.

Accordingly, it is not possible to actively control a vehicle and, thus, there are various problems in that the coasting guidance function is inevitably limited, and it is difficult to maximize an effect of enhancing fuel efficiency due to low accuracy and reliability of control for coasting and guidance.

In addition, a logic for guidance of coasting is very complicated and a map value needs to be mapped to an input parameter based on a test value obtained via an advanced test in order to previously write and set a map for determining expected vehicle speed and so on and, accordingly, it is disadvantageous that errors are greatly increased when an environment change is changed and much time is consumed for mapping.

SUMMARY

The present disclosure has been made in an effort to solve the above-described problems associated with the prior art.

In one aspect, the present disclosure provides a coasting control method of an eco-friendly vehicle, for simplifying a logic for vehicle control for coasting and coasting guidance, easily mapping and writing map data, and enhancing the accuracy, reliability, and efficiency of control.

In a preferred embodiment, a coasting control method of an eco-friendly vehicle includes steps of acquiring, by a controller in the vehicle, deceleration event information and road gradient information in front of a vehicle during driving, determining, by the controller, target vehicle speed in a deceleration event in consideration of road gradient based on the deceleration event information and the road gradient information, determining, by the controller, expected vehicle speed while the vehicle is decelerated in a coasting state, based on current vehicle speed, determining, by the controller, a start location for starting coasting based on target vehicle speed in consideration of current vehicle speed of the vehicle and the road gradient and expected vehicle speed at a target location as a deceleration event location, operating, by the controller, an information provider for coasting guidance and coasting induction to a driver at a start location, and controlling, by the controller, a creep torque of a driving motor during coasting of the vehicle in a brake pedal and accelerator pedal off state.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

Figure 1:
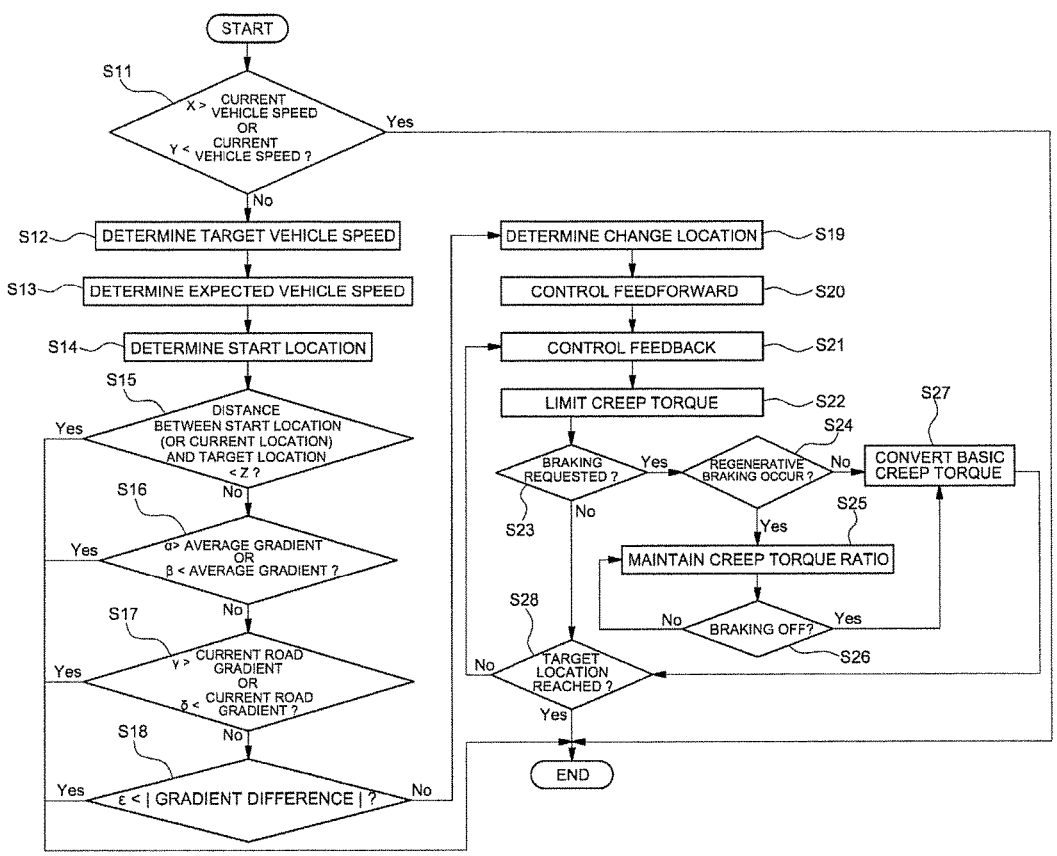
FIG. 1 is a flowchart of a coasting control method according to an embodiment of the present disclosure.

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments.

Throughout the specification, one of ordinary skill would understand terms 'include', 'comprise', and 'have' to be interpreted in default as inclusive or open rather than exclusive or closed unless expressly defined to the contrary.

The present disclosure provides a method of controlling coasting of an eco-friendly vehicle, for simplifying a logic for control of a vehicle for coasting and for guidance of coasting, for easily mapping and writing map data, and enhancing the accuracy, reliability, and efficiency of control.

The coasting control method according to the present disclosure may be applicable to an eco-friendly vehicle using a motor as a vehicle driving source and adjusting a regenerative mode and deceleration speed using a motor during coasting.

In detail, the coasting control method according to the present disclosure may be applicable to an eco-friendly vehicle such as a pure electric vehicle, a hybrid vehicle, or a fuel cell vehicle and may be widely applicable to a plug-in hybrid electric vehicle (PHEV) as a general hybrid electric vehicle (HEV) as a hybrid electric vehicle.

For reference, a problem of the prior art will be further described to clearly understand a difference between the prior art and the present disclosure.

First, in the prior art, target vehicle speed determined for each deceleration event is used without change and, thus, the accuracy and reliability of control is inevitably low.

In more detail, the target vehicle speed needs to be classified for each event but characteristics, road conditions, or the like for each event are not absolutely reflected. In this regard, in the prior art, predetermined target vehicle speed is simply used without change according to an event type but a surrounding road condition is not considered for the target vehicle speed.

For example, conventionally, target vehicle speed that is preset without consideration of road gradient for each event is used without change and, accordingly, there is a need to use target vehicle speed to which road gradient information for enabling coasting of a vehicle, that is, road gradient to a target location as an event location from a current location or a start location of coasting of the vehicle is applied, in order to enhance the accuracy and reliability of control.

When types of deceleration events present in front of a driving vehicle are the same, for example, when ICs as a deceleration event that requires vehicle deceleration are present in front of a current vehicle location, the same target vehicle speed is determined for two cases in which the ICs are present and, accordingly, the same target vehicle speed may be used in actual control.

That is, in the two cases, even if road gradients before a target location of an IC are actually much different, the same target vehicle speed determined without consideration of road gradient may be used in the prior art.

As such, in the prior art, target vehicle speed that is simply determined for each event, for example, target vehicle speed determined without consideration of road gradient, is used and, accordingly, the accuracy and reliability of control is inevitably low.

In the prior art, there is a problem in that lock-up charging is maintained during coasting.

Lock-up charging refers to control in which an engine is turned on for a while instead of immediately turning off the engine when a driver takes their foot off an accelerator pedal and, that is, refers to control in which a battery is recharged by a motor in a state in which an engine clutch is locked-up or closed instead of immediately turning off the engine because there is the possibility that a driver re-pushes an accelerator pedal even if takes their foot off the accelerator pedal.

Since such lock-up charging prevents frequent engine on/off to enhance fuel efficiency, coasting is performed in a condition in which a vehicle needs to be decelerated due to a deceleration event present in front of the vehicle and, accordingly, although the possibility of re-deceleration is very low, in the prior art, there is no logic for recognizing this and, thus, lock-up charging is also maintained during coasting.

In the prior art, a control logic for coasting is also executed on an uphill road and on a downhill road with very high gradient (road gradient) and, accordingly, since it is not possible to decelerate a vehicle on a downhill road with high gradient, it is not possible to achieve target vehicle speed and, since deceleration of the vehicle is very high on an uphill road with high gradient, the vehicle may stop in the middle of coasting.

Accordingly, there is a need to limit a logic for vehicle control for coasting and coasting guidance on an uphill road and on a downhill road with very high gradient.

In the prior art, a test is performed for each gradient (%) of an uphill road and a downhill road, expected vehicle speed is determined at each location of a corresponding vehicle and, then, the determined expected vehicle speed for each location is mapped to a map value. However, it takes an excessively long time to perform the test on an uphill road and on a downhill road for each gradient and to map expected vehicle speed to the test value.

In addition, a test needs to be further performed on uphill roads and on downhill roads with various gradients for a test for each gradient and, accordingly, in the case of numerous types of vehicles, when expected vehicle speed for each gradient is obtained and, then, is mapped to a map value, it is almost impossible to write and set a map of expected vehicle speed and to apply the map to each vehicle type in a mass production operation and, accordingly, there is a need for solutions for overcoming the issue.

In the prior art, a creep torque variable logic is not applied and, thus, it is very difficult to satisfy target vehicle speed via only coasting and coasting needs to be guided while guiding coasting at a very long distance but not at an appropriate distance based on a front event and, accordingly, in this case, there is the possibility that a driver needs to re-push an accelerator pedal due to a large difference between a vehicle driven via coasting and a surrounding vehicle.

Accordingly, the present disclosure proposes a coasting control method for overcoming the above all problems.

First, in the present disclosure, the deceleration event (hereinafter, referred to as an 'event') refers to a point that is positioned in front of a vehicle on a road on which the vehicle is driving and that requires vehicle deceleration and, for example, may include a speed limit road with limited speed, an intersection, a curved road, an interchange (IC), or a junction (JC), may include a position around a traffic light or a tollgate, a U-turn point, a left turn point, or a right turn point on a driving path to a destination set in a navigation device, and may also include a destination at which the vehicle needs to stop.

This may be purely exemplary and the present disclosure is not limited thereto and, thus, the deceleration event may include any position at which target vehicle speed is determined and a vehicle needs to be decelerated.

Target vehicle speed may be predetermined for each event and each event type, which is target vehicle speed determined without consideration of a road condition such as road gradient, and may be limited speed in the case of a speed limit road that requires limited speed, regulated speed at an intersection, or regulated speed set according to roadway radius of curvature on a curved road.

Such target vehicle speed is set for each event and is used to control coasting but, in the present disclosure, target vehicle speed determined in consideration of road gradient in front of a vehicle is used and, hereinafter, for distinguishing between the prior art and the present disclosure, conventionally used target vehicle speed, that is, conventional target vehicle speed that is determined for each event without consideration of road gradient will be referred to as regulated target vehicle speed.

Hereinafter, target vehicle speed refers to target vehicle speed in a specific event, which is determined in consideration of road gradient from the regulated target vehicle speed, and need to be understood to be distinguished from target vehicle speed (which is regulated target vehicle speed) that is used in a logic according to the prior art.

In the present disclosure, coasting refers to vehicle driving using inertia in a state in which an engine clutch is open or released and a state in which a driver takes their foot off both an accelerator pedal and a brake pedal.

Coasting may include coasting in which a vehicle is driven via only inertia without generation of creep torque in that creep torque by a motor is not generated (creep torque=0) or is generated and used and may be understood as a broad range compared with coasting.

Hereinafter, a coasting control method according to an embodiment of the present disclosure will be described.

FIG. 1 is a flowchart of a coasting control method according to an embodiment of the present disclosure.

Figure 2:
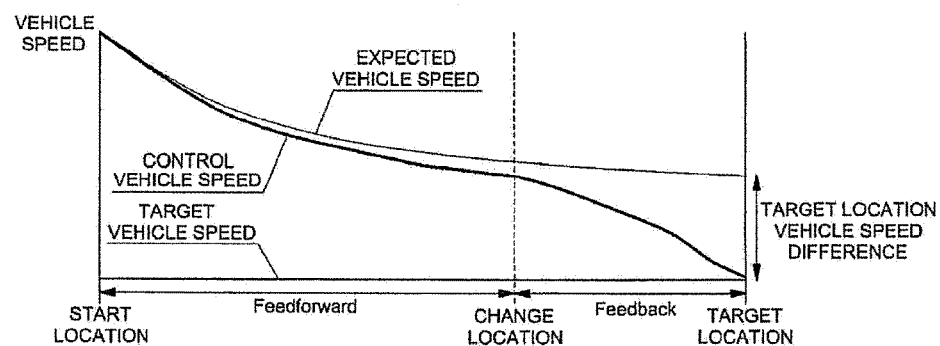
FIG. 2 is a diagram showing an example of expected vehicle speed, controlled vehicle speed, target vehicle speed, and target location vehicle speed difference in a coasting control method according to an embodiment of the present disclosure.
Figure 3:
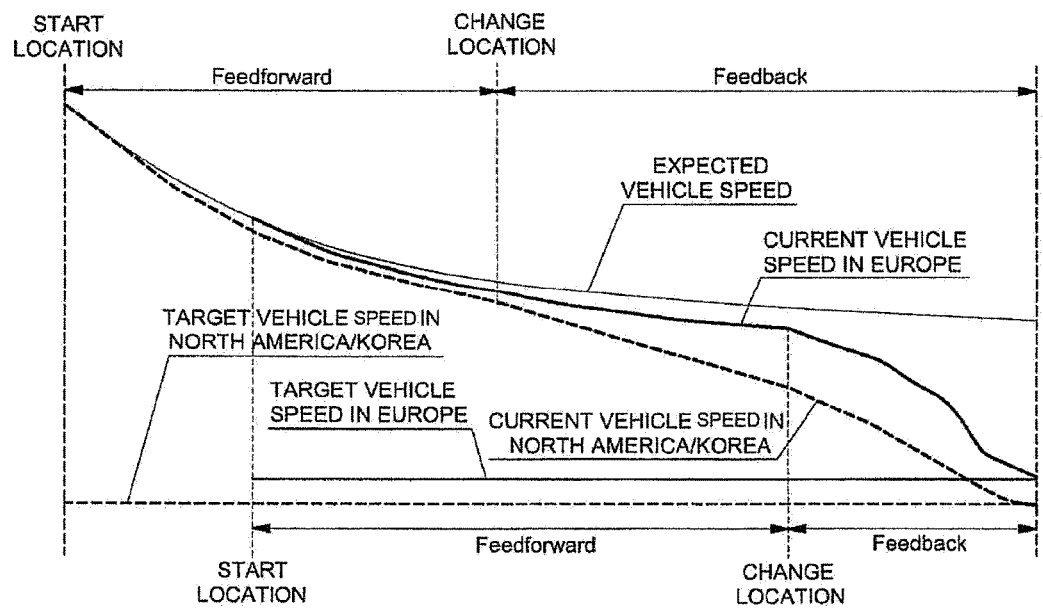
FIG. 3 is a diagram showing an example in which a start location for starting coasting, a change location for changing feedforward control to feedback control, etc. are distinguishable for each country and region in a coasting control method according to an embodiment of the present disclosure.

FIG. 2 is a diagram showing an example of expected vehicle speed, controlled vehicle speed, target vehicle speed, and target location vehicle speed difference in a coasting control method according to an embodiment of the present disclosure. FIG. 3 is a diagram showing an example in which a start location for starting coasting, a change location for changing feedforward control to feedback control, etc. are distinguishable for each country and region in a coasting control method according to an embodiment of the present disclosure.

The coasting control method according to the present disclosure may be performed by a controller in a vehicle and the controller may perform each operation of the coasting control method using information collected in a vehicle.

The controller is an electric circuitry that executes instructions of software which thereby performs various functions described hereinafter.

First, upon determining that an event requiring deceleration is currently present in front of a vehicle on a road on which the vehicle is driven, the controller may determine target vehicle speed using information on road gradient to a target location as a location of the event from a current location of the vehicle (S12).

According to an embodiment of the present disclosure, a current vehicle location and information on an event present in front of a vehicle, that is, information on an event location and information on regulated target vehicle speed of the event may be acquired using map data stored in a data storage and global positioning system (GPS) information received through a GPS receiver.

Here, the map data may be high accuracy map data configured to provide three-dimensional (3D) geographical information, that is, 3D road information containing altitude information in a 2D plane and may be 3D map data for providing event location and regulated target vehicle speed information, and information on road gradient to a target location of an event from a current vehicle location.

The 3D map data may be a map database of an advanced driver assistance system (ADAS) that is pre-installed in a vehicle and, in this regard, location information of each event that requires deceleration, regulated target vehicle speed information of each event, gradient information of a surrounding road of each event, and so on may be input and stored in the 3D database of the ADAS and may be used.

In the present disclosure, a controller recognizes a vehicle current location and an event present in front of a vehicle using 3D map data stored in the data storage and GPS information received through a GPS receiver during vehicle driving and notifies a driver of an appropriate time for accelerator pedal off through an information provider (which may be an indicator of a cluster, a display device in the vehicle, or the like), as described later.

According to an embodiment of the present disclosure, a controller may be configured to acquire information on a current location, event information, and road gradient information from a navigation device of a vehicle and, when a driver sets a driving path to a destination through a navigation device, the controller may receive information on an event present on the driving path, and information on road gradient, and information on a current vehicle location from the navigation device during vehicle driving.

Upon checking an event in front of a vehicle, the controller may calculate target vehicle speed in an event in consideration of road gradient and, here, the target vehicle speed may be obtained from regulated target vehicle speed determined for each event and road gradient.

In this case, according to an embodiment of the present disclosure, the target vehicle speed may be determined by determining gradient factors from the regulated target vehicle speed and the road gradient and, then, multiplying the regulated target vehicle speed by the determined gradient factor in the controller, according to expression 1 below.

Target vehicle speed in consideration of road
gradient=Regulated target vehicle speed×Gradient factor    [Expression 1]

Here, the road gradient may be average gradient of a road between a current vehicle location and a target location of an event and, accordingly, the gradient factor may be determined from the regulated target vehicle speed and the average gradient.

According to an embodiment of the present disclosure, the controller may determine the gradient factor using pre-input and stored set data from the regulated target vehicle speed and the average gradient and the set data stored in the controller may be a table or map of Table 1 below in which a gradient factor is set as a value based on the regulated target vehicle speed and the average gradient.

TABLE 1

| Gradient Factor | Average Gradient | | | | |
|---|---|---|---|---|---|
| Regulated Target Vehicle Speed | — | — | — | — | — |
| | — | — | — | — | — |
| | — | — | — | — | — |

The set data, that is, the table or map for determining the gradient factor may be written using information acquired in a pre-test procedure and, thus, may be used to determine target vehicle speed while being pre-input and stored in the controller.

Then, as described above, when the target vehicle speed in consideration of the road gradient is determined, expected vehicle speed may be determined while a vehicle is decelerated in a coasting state (accelerator pedal off and brake pedal off state) from current vehicle speed (S13).

According to an embodiment of the present disclosure, expected vehicle speed may be determined from flatland expected vehicle speed information obtained via a test on flatland, load torque, and basic creep torque according to an expression.

The expected vehicle speed may be vehicle speed for deceleration due to vehicle driving resistance such as rolling resistance and air resistance until a vehicle reaches a target location after beginning to be decelerated in a coasting state from current vehicle speed and may refer to a deceleration profile of vehicle speed obtained according to a position to a target location.

According to an embodiment of the present disclosure, expected vehicle speed at each location may be calculated as a value obtained by compensating for flatland expected vehicle speed at vehicle current vehicle speed by as much as offset calculated using load torque based on road gradient and creep torque information based on vehicle speed, according to expression 2 below.

To this end, flatland expected vehicle speed information for each current vehicle speed may be pre-input and stored in the controller.

Expected vehicle speed=Expected vehicle speed on flatland+Offset    [Expression 2]

Here, offset may be obtained for each location to a destination location from a current location and may be calculated using a coast down (C/D) value of a vehicle, and load torque and basic creep torque information depending on gradient.

In more detail, the offset may be calculated as a value of '[(C/D value of vehicle×tire dynamic radius×F1)+(load torque×F2)+(creep torque×power train efficiency)]'.

Here, the C/D value is a vehicle unique value that is pre-input and stored in the controller, is a value corresponding to driving resistance including rolling resistance and air resistance, and is a test value obtained during a driving resistance test procedure of a corresponding vehicle.

The C/D value is vehicle unique value information that is pre-acquired via a test with respect to a corresponding vehicle in a vehicle development stage and is well known and, thus, a detailed description thereof will be omitted here.

F1 and F2 indicate factor values that are pre-input and stored in the controller and, in this case, 'C/D value of vehicle×tire dynamic radius×F1' may be a torque value corresponding to driving resistance of a vehicle.

The creep torque refers to basic creep torque set for each vehicle speed and, here, vehicle speed is expected vehicle speed on flatland, and basic creep torque corresponding to expected vehicle speed on flatland is determined for each location using set data such as the table or map that is pre-input and stored in the controller.

The creep torque is torque generated by a motor, and the creep torque using the motor during general coasting is negative torque and permits a battery to be recharged via a generation operation of the motor during generation of the creep torque using the motor.

The tire dynamic radius and the power train efficiency may be a vehicle unique value and may be pre-input and stored in the controller.

FIG. 2 shows an example of expected vehicle speed to a target location from a start location in the form of a deceleration profile and, here, controlled vehicle speed refers to vehicle speed controlled via feedforward control and feedback control, which are to be described later, in a coasting state.

Then, upon determining the expected vehicle speed, the controller may determine a start location for starting vehicle driving in an accelerator pedal off and brake pedal off state, that is, coasting (S14) and, here, the start location may refer to an optimal vehicle location at which a driver takes their foot off an accelerator pedal to start coasting.

The start location may be defined based on a distance to a vehicle from a target location of an event present in front of a vehicle along a road on which the vehicle is driven.

The start location may be a location at which a coasting guidance function is performed and the controller operates the information provider to induce coasting of a driver when the vehicle reaches the start location.

That is, the driver may be asked to drive a vehicle in a coasting state through the information provider, and the driver may check coasting guidance indicated by the information provider and, then, take off their foot of the accelerator pedal to cause vehicle coasting.

The information provider may not be particularly limited as long as the driver visually and acoustically recognizes coasting guidance and, for example, may include an indicator of a cluster, a display device of an audio, video, and navigation (AVN) device, a head-up display (HUD), or other display device in a vehicle.

According to an embodiment of the present disclosure, with regard to determination of the start location, the controller may be set to determine a start location from the current vehicle speed and the target location vehicle speed difference.

Here, the target location vehicle speed difference may refer to a difference between target vehicle speed and expected vehicle speed until a vehicle is decelerated to expected vehicle speed and reaches a target location of an event, and the controller may determine the start location from the current vehicle speed and the target location vehicle speed difference using the set data that is pre-input and stored in the controller.

The set data for determining the start location may be a table or map in which a start location is set based on the current vehicle speed and the target location vehicle speed difference.

FIG. 2 shows an example of expected vehicle speed, controlled vehicle speed controlled via coasting control, target vehicle speed, and target location vehicle speed difference, according to an embodiment of the present disclosure and also shows a change location which will be described later.

Then, upon determining the start location, the controller may determine a change location using the pre-input and stored set data from target vehicle speed and event information (S19).

As shown in FIG. 2, the change location may refer to a location at which feedforward control is changed to feedback control, which will be described later, during creep torque control and may be defined based on a distance from the start location.

The change location may be calculated according to expression 3 below.

Change location=Distance between start location and
    target location−Remaining Distance    [Expression 3]

Here, the remaining distance may be a distance to a change location from a target location and, here, the controller may determine the remaining distance using the set data from the target vehicle speed and the event information and, then, may determine the change location according to expression 3 above.

In this case, the event information may be an event type such as IC, JC, and intersection.

The set data may be the table or map shown in Table 2 below in which the remaining distance is set according to target vehicle speed and event type.

TABLE 2

| Remaining Distance | Target Vehicle Speed | | | | |
|---|---|---|---|---|---|
| Event Type | — | — | — | — | — |
|  | — | — | — | — | — |
|  | — | — | — | — | — |

In the table or the map, remaining distances set according to target vehicle speed and an event type may be differently mapped for each country and region.

For example, comparing remaining distances with respect to the same target vehicle speed and event type, the remaining distance in a country that prefers smooth driving, such as Korea or the USA, may be set to be greater than in the European country as the change location becomes close to the start location.

In a country that prefers sporty driving, such as Europe, the remaining distance may be set to be relatively small as a change location becomes close to a target location, compared with in Korea or the USA.

Then, in a state in which the vehicle reaches a start location, when a driver starts coasting according to guidance of an information display, feedforward control may be started by the controller (S20).

That is, when the driver that checks coasting guidance of the information display takes their foot off an acceleration pedal at a start location, feedforward control may be started and may be maintained up to the determined change location.

When the vehicle reaches the change location, change to feedback control may be performed (S21) and feedback control may be started by the controller at a change location and may be maintained up to the target location.

During feedforward control and feedback control, coasting motor torque for decelerating the vehicle by the controller may be applied and, in this case, the coasting motor torque applied to the motor is negative torque so as to recharge a battery using the motor.

According to an embodiment of the present disclosure, the coasting motor torque applied to the motor during feedforward control may be determined as a value obtained by adding additional torque determined according to current vehicle location information and target vehicle speed to basic creep torque.

Here, the basic creep torque may be determined based on vehicle speed and, in this case, the vehicle speed may refer to current vehicle speed (that is, controlled vehicle speed) of a vehicle, which is controlled during coasting.

The additional torque may be determined based on the current location information and the target vehicle speed and, here, the current location information may be a distance between a current vehicle location and a change location and the controller may be set to determine additional torque using the pre-input and stored set data from the distance and the target vehicle speed.

The set data for determination of the additional torque may be a table or a map in which additional torque is set according to the distance and the target vehicle speed.

As such, when the driver takes their foot off the accelerator pedal at a start location, the feedforward control may be started to apply the coasting motor torque obtained by adding the additional torque to the basic creep torque to the motor and, in this case, the basic creep torque and the additional torque are negative torque (motor regenerative torque) and, thus, a deceleration effect of the vehicle may be obtained while the battery is recharged via a generation operation of the motor.

According to an embodiment of the present disclosure, the basic creep torque as negative torque in the motor may be set to have a small absolute value as vehicle speed is reduced.

That is, as vehicle speed is reduced, creep torque may be reduced.

When additional torque is excessively high at a very long distance from a target location during feedforward control, a vehicle is in an excessively high deceleration state compared with a flow of a surrounding vehicle and, thus, vehicle speed may be excessively low.

Accordingly, the additional torque needs to be mapped in consideration of attributes for each country or region and, as described above, may be mapped to a value according to a distance between a current location and a change location and the target vehicle speed.

As described above, while coasting is started at a start location and feedforward control is performed and while feedback control to be described later is performed, the controller may operate and control the information provider to indicate that corresponding control is executed and, thereby, the driver may recognize that coasting of the vehicle is performed.

Then, when feedforward control is started at a start location and, then, the vehicle reaches a change location, feedforward control may be changed to feedback control (S21). During feedback control, the controller may control vehicle speed to become target vehicle speed at a target location using a difference between target vehicle speed and controlled vehicle speed (current vehicle speed during control) and a distance between a target location and a current location (vehicle location during control).

Here, the controlled vehicle speed may refer to real-time current vehicle speed during feedback control, that is, vehicle speed controlled during feedback control and control of vehicle speed may refer to creep torque of a driving motor, in more detail, coasting motor torque applied to the motor.

FIG. 3 shows an example of a vehicle speed state during coasting according to an embodiment of the present disclosure, shows expected vehicle speed and current vehicle speed (controlled vehicle speed), and indicates that coasting control is distinguished for each country and region.

As shown in the drawing, coasting control may be differentiated according to Korea, North America such as the USA, and Europe and, in more detail, a start location and a change location mapped to data set data of a table, a map, or the like may be differentiated according to a country and a region.

Referring to FIG. 3, coasting is started at a start location and vehicle speed is reduced to reach target vehicle speed at a target location via coasting control (feedforward and feedback control).

When feedforward control is started at a start location and, then, a vehicle arrives at a change location, feedforward control may be converted into feedback control and, in this case, a controller may acquire a start location and a change location as differentiated values according to Korea, North America, and Europe.

The coasting control method according to an embodiment of the present disclosure may further include determining whether a vehicle enters coasting control, based on road gradient.

Here, upon determining that the vehicle does not enter coasting control, the controller may not perform coasting guidance using the information provider and may not also perform coasting control including feedforward control and feedback control even if a driver takes their foot off an accelerator pedal.

First, on an uphill road, gradient (positive value) of which is greater than a preset value (positive value), deceleration of a vehicle is excessively high and, thus, entrance into coasting control may be limited in order to prevent a driver from re-pushing an accelerator pedal (since a vehicle is driven excessively slowly, the driver may push the accelerator pedal).

In addition, on a downhill road, gradient (negative value) of which is smaller than a preset value (negative value) (an absolute value of the gradient is greater than an absolute value of the set value), there is a limit in controlling vehicle deceleration using only a motor, that is, it is difficult to decelerate the vehicle via only motor control and, thus, entrance into coasting control may be limited.

As such, the controller may determine whether the vehicle enters coasting control based on gradient of a road and, in this case, coasting control may not be performed on an uphill road and on a downhill road with gradient that is equal to or higher than at a predetermined level.

In this case, road average gradient to a target location from a start location may be calculated and used to determine whether the vehicle enters coasting control, and as shown in FIG. 1, when average gradient (negative value, which corresponds to a downhill road) is smaller than a first set value ($\alpha$, negative value) ($\alpha$>average gradient) or average gradient (positive value, which corresponds to an uphill road) is greater than a second set value ($\beta$, positive value) ($\beta$<average gradient) in operation S16, entrance into coasting control may not be performed (control logic termination).

When the vehicle reaches the start location, current road gradient, that is, road gradient of the start location may be used to determine whether the vehicle enters coasting control.

That is, in operation S17 of FIG. 1, when current road gradient (negative value, which corresponds to a downhill road) at the start location is smaller than a third set value ($\gamma$, negative value) ($\gamma$>current road gradient) or current road gradient (positive value, which corresponds to an uphill road) is greater than a fourth set value ($\delta$, positive value) ($\delta$<current road gradient), entrance into coasting control may not be performed (control logic termination).

When a difference between the current road gradient at the start location and the average road gradient is excessively high, a current section may be determined as a section with low reliability of gradient or very high variation in gradient and entrance into coasting control may be limited.

That is, as shown in FIG. 1, in operation S18, when an absolute value of a difference between current road gradient (negative value, which corresponds to a downhill road) at the start location and the average road gradient (negative value, which corresponds to a downhill road) is greater than a fifth set value ($\varepsilon$, positive value) ($\varepsilon$<absolute value of gradient difference), entrance into coasting control may not be performed (control logic termination).

In the coasting control method according to an embodiment of the present disclosure, when a distance to a start location or a vehicle location at which the start location is determined from a target location is smaller than a sixth set value z, entrance into coasting control may be limited (S15).

As described above, in operation S14, when the start location is determined based on the current vehicle speed and the target location vehicle speed difference, in operation S15, the controller may calculate a distance to the determined start location from the target location and compare the distance with the sixth set value z and, when the distance is smaller than the sixth set value z (distance between the start location and the target location <z), coasting control may not be performed.

In this case, the controller may determine the sixth set value z according to the target vehicle speed and an event type and, in a procedure of determining the sixth set value, set data such as a table or a map of Table 3 below in which the sixth set value z is set according to the target vehicle speed and an event type may be used.

TABLE 3

| Z | Target Vehicle Speed | | | | |
|---|---|---|---|---|---|
| Event Type | — | — | — | — | — |
|  | — | — | — | — | — |
|  | — | — | — | — | — |

As such, the distance from the target location to the start location or the vehicle location at which the start location is determined is excessively short, that is, less than the sixth set value z, it is difficult to make vehicle speed reach the target vehicle speed at the target location and, a driver is determined to already perform eco-driving and entrance into coasting control may be limited.

Then, when current vehicle speed is excessively low or high (e.g., vehicle speed<20 kph, 160 kph<vehicle speed), a current section deviates from a controllable section and, thus, entrance into coasting control may be limited.

That is, in operation S11, when current vehicle speed is less than lower speed limit (x) (x>current vehicle speed) or exceeds upper speed limit (y) (y<current vehicle speed), control logic of all subsequent operations is terminated and, accordingly, the controller may not perform coasting control.

Coasting control according to the present disclosure refers to control using only motor torque without use of hydraulic braking (friction braking) using brake equipment for vehicle deceleration and is mainly used to guide a driver to perform eco-driving.

However, a difference between the target vehicle speed and the controlled vehicle speed (real-time vehicle speed of controlled vehicle) is high, a large amount of creep torque may be required (the creep torque is negative torque and, thus, an absolute value of the creep torque as negative torque is increased).

The coasting guidance according to the present disclosure is mainly used to guide eco-driving and, accordingly, even if vehicle speed is temporally lower than desired vehicle speed, it is not desirable to require motor creep torque in a positive (+) direction.

Accordingly, a maximum value of creep torque needs to be restrictedly set and cause of unintended acceleration of a vehicle needs to be limited.

On the other hand, when excessively small creep torque is required, there is a problem in terms of brake lamp lighting and vehicle safety on a low-friction road.

Accordingly, according to an embodiment of the present disclosure, during coasting control, that is, during feedforward control and feedback control, the controller may be set to limit creep torque of the motor to a preset maximum value and minimum value (S22).

In addition, lock-up charging control refers to control that rather degrades fuel efficiency in a situation in which a vehicle is continuously decelerated like in coasting and, accordingly, according to the present disclosure, the controller may be set to prevent lock-up charging during coasting.

As such, lock-up charging during coasting may be limited so as to enhance fuel efficiency.

Then, a driver may push a brake pedal during coasting control according to the present disclosure.

As such, when the driver pushes the brake pedal (S23), hydraulic braking using brake equipment and regenerative braking using a motor may be started from a brake start time in which the brake pedal is pushed.

In an eco-friendly vehicle, general regenerative braking may be performed under cooperative control of a hybrid control unit (HCU) as a higher controller, a motor control unit (MCU) for controlling an operation of a motor, a battery management system (BMS) for control of managing a battery, a brake control unit (BCU) for brake control of a vehicle, a transmission control unit (TCU) for control of an operation of a transmission, and so on.

That is, when the driver pushes the brake pedal, the brake control unit (BCU) may determine a total braking amount required by a vehicle depending on a braking input value of the driver and the hybrid control unit (HCU) may determine a regenerative braking available amount based on information such as battery rechargeable power and motor rechargeable power and transmit the determined regenerative braking available amount to the brake control unit (BCU).

Here, the braking input value of the driver may be a value depending on a brake pedal manipulation value of the driver and, in more detail, may be a brake pedal depth or brake pedal stroke that is a signal value of a brake pedal sensor (BPS).

Accordingly, the brake control unit (BCU) may divide a total braking amount to a friction braking amount (hydraulic braking amount) using brake equipment (friction brake equipment or hydraulic brake equipment) and a regenerative braking amount using a motor (distribution of braking force) to calculate a regenerative braking permissible amount based on a regenerative braking available amount.

Then, when the brake control unit (BCU) transmits the regenerative braking permissible amount to the hybrid control unit (HCU), the hybrid control unit (HCU) may generate and output a regenerative torque command (motor torque command) according to a regenerative braking permissible amount and the motor control unit (MCU) may control a regenerative operation of the motor according to the regenerative torque command output by the hybrid control unit (HCU).

In addition, the hybrid control unit (HCU) may calculate a regenerative braking performing amount according to whether speed is changed using speed change state information received by the transmission control unit (TCU) and the brake control unit (BCU) may receive the regenerative braking performing amount from the hybrid control unit (HCU) and may lastly determine a friction braking amount obtained by subtracting the regenerative braking performing amount from the total braking amount as a friction braking amount.

Then, the brake control unit (BCU) may control an operation of the friction brake equipment to generate braking force corresponding to the lastly determined friction braking amount and, lastly, may satisfy total braking force required by the driver using the regenerative braking force using the motor and the friction braking force using the friction brake equipment.

In this case, when regenerative braking is performed, that is, when the regenerative braking permissible amount is generated, a controller for coasting according to the present disclosure (which may be the hybrid control unit (HCU)) may reduce coasting motor torque applied to the motor using the sum of 'basic creep torque+additional torque' and, in this case, the coasting motor torque may be reduced while continuously maintaining a ratio of basic creep torque and additional torque of the coasting motor torque as the same ratio as at a braking start time, that is, at a time in which the driver pushes the brake pedal to generate the regenerative braking permissible amount (S23 to S25).

When regenerative braking is limited, that is, when the total braking amount is generated but the regenerative braking permissible amount is not generated, the coasting motor torque may be converted into basic creep torque (S27).

That is, a driving motor may be controlled using the basic creep torque as the coasting motor torque.

In this case, since a vehicle is decelerated, the basic creep torque may be gradually reduced according to vehicle speed but a variation rate of basic creep torque may be limited not to indicate a variation rate of a predetermined level or more such that the basic creep torque is gradually changed (it is possible to apply rate limit and a filter).

When a driver takes their foot off the brake pedal (control off) (S26) and a total braking amount is not generated (total braking amount=0), coasting motor torque may be converted into basic creep torque (S27) and a vehicle may be decelerated using only coasting while a motor is controlled by the basic creep torque.

During such a control off state, a variation rate of the basic creep torque may also be limited not to indicate a variation rate of a predetermined level or more such that the basic creep torque is gradually changed (it is possible to apply rate limit and a filter).

The vehicle is decelerated via coasting such that vehicle speed is target vehicle speed and, simultaneously, when the vehicle reaches a target location of an event (S28), coasting control may be terminated.

As such, the coasting control method according to the present disclosure has been described above and, according to the present disclosure, a logic for vehicle control for coasting and coasting guidance may be simplified, it may be easy to map and write map data, and the accuracy, reliability, and efficiency of control may be enhanced.

In more detail, conventionally, tests are performed for each gradient (%) of an uphill road and a downhill road, expected vehicle speed is determined and, then, is mapped to a map value. However, unlike in the prior art in which tests are performed for all gradients, according to the present disclosure, only expected vehicle speed on flatland may be determined via a test and, then, expected vehicle speed corresponding to a current uphill and downhill road condition may be determined using the expected vehicle speed information on flatland according to a mathematical expression.

Accordingly, unlike in the prior art in which expected vehicle speed is determined based on a map, expected vehicle speed is determined mainly based on a mathematical expression and, thus, it may be advantageous that a logic is simplified, mapping is simplified and eased, and a mapping time is remarkably reduced.

Even if calculation error occurs, control accuracy may be further enhanced via active control and excellent control accuracy may be ensured via variation in creep torque during coasting control.

Conventionally, control accuracy on uphill and downhill roads is very degraded and, also, it is not possible to change creep torque and, thus, there is a problem in that it is difficult to reach target vehicle speed using only coasting and coasting and coasting guidance are started at a position spaced apart from a deceleration event compared with an appropriate location to cause sense of difference such as mismatch with speed of surrounding vehicles to a driver and, accordingly, the driver frequently re-pushes the accelerator pedal.

For example, when speed of 120 kph is average speed and flow of vehicles on an expressway and an exit is viewed, target vehicle speed is satisfied via coasting from a point of 2 km before and, in this case, danger of accident may be rather increased due to excessively low vehicle speed in the middle of driving and, accordingly, drivers are not frequently capable of using a coasting function.

The present disclosure may overcome the problems to enhance efficiency as well as control accuracy and reliability, thereby enhancing vehicle fuel efficiency.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A coasting control method of an eco-friendly vehicle, the method comprising steps of:

acquiring, by a controller of the vehicle, deceleration event information and road gradient information in front of a vehicle during driving;
    determining, by the controller, target vehicle speed in a deceleration event in consideration of road gradient based on the deceleration event information and the road gradient information;
    determining, by the controller, expected vehicle speed estimated on the basis of current vehicle speed of the vehicle while the vehicle is decelerated from the current vehicle speed in a coasting state;
    determining, by the controller, a start location for starting coasting based on target vehicle speed in consideration of current vehicle speed of the vehicle and the road gradient and expected vehicle speed at a target location as a deceleration event location;
    operating, by the controller, an information provider for coasting guidance and coasting induction to a driver at a start location; and
    controlling, by the controller, a creep torque of a driving motor during coasting of the vehicle in a brake pedal and accelerator pedal off state.

2. The method according to claim 1, wherein the deceleration event information is regulated target vehicle speed that is predetermined for each target location and deceleration event; and wherein the step of determining target vehicle speed comprises determining a gradient factor corresponding to the regulated target vehicle speed and the road gradient and determining the target vehicle speed in consideration of the road gradient by multiplying the regulated target vehicle speed by the determined gradient factor.

3. The method of claim 1, wherein the road gradient is road average gradient to the target location from a current vehicle location acquired during driving.

4. The method of claim 1, wherein, in the step of determining expected vehicle speed, the controller determines the expected vehicle speed as a speed value obtained by compensating for flatland expected vehicle speed as expected vehicle speed while the vehicle is decelerated in a coasting state from current vehicle speed on flatland by offsetting the speed value by an offset value calculated using load torque based on road gradient and creep torque information based on vehicle speed; and wherein flatland expected vehicle speed information for each current vehicle speed is pre-input and stored in the controller.

5. The method of claim 4, wherein the offset value is calculated by expression E1 below:

$E1$: Offset=[($C/D$ value of vehicle×tire dynamic radius×$F1$)+(load torque×$F2$)+(basic creep torque×power train efficiency)]

where the C/D value is a vehicle unique value that is pre-input and stored in the controller and a coast down value corresponding to vehicle driving resistance, F1 and F2 are factor values pre-input and stored in the controller, and a tire dynamic radius and power train efficiency are vehicle unique values pre-input and stored in the controller.

6. The method of claim 1, wherein, in the step of determining a start location, the controller calculates target location vehicle speed difference as a difference between the target vehicle speed in consideration of the road gradient and the expected vehicle speed at the target location, and determines a start location corresponding to the current vehicle speed of the vehicle and the target location vehicle speed difference.

7. The method of claim 1, further comprising determining a change location based on target vehicle speed and deceleration event information in consideration of the road gradient, and the determined start location, by the controller,
wherein the step of controlling a creep torque of a driving motor is a control operation performed by the controller, comprising:
a feedforward control operation of controlling the driving motor using coasting motor torque as a value obtained by adding an additional torque determined according to the current vehicle speed and the target vehicle speed to basic creep torque according to vehicle speed until the vehicle reaches the determined change location from the determined start location; and
a feedback control operation of controlling a coasting motor torque of the driving motor such that vehicle speed is the target vehicle speed in consideration of the road gradient until the vehicle reaches the target location from the determined change location.

8. The method according to claim 7, wherein the feedforward control operation comprises determining the coasting motor torque as a value obtained by adding an additional torque determined according to a current vehicle location and the target vehicle speed to basic creep torque determined according to vehicle speed.

9. The method according to claim 8, wherein the additional torque is determined as a value corresponding to a distance between the current vehicle location and the change location and the target vehicle speed.

10. The method according to claim 7, wherein, during the step of controlling a creep torque of a driving motor, when the driver manipulates the brake pedal, the controller reduces the coasting motor torque of the driving motor while maintaining a ratio of the basic creep torque and the additional torque during regenerative braking.

11. The method according to claim 10, wherein the controller controls the driving motor using the basic creep torque as the coasting motor torque when the regenerative braking is limited in a state in which the driver manipulates the brake pedal.

12. The method according to claim 10, wherein the controller controls the driving motor using the basic creep torque as the coasting motor torque when the brake pedal is manipulated and then is in a pedal off state.

13. The method according to claim 1, wherein the controller does not perform the step of operating an information provider and does not perform the step of controlling a creep torque of a driving motor on a downhill road on which a road average gradient to the target location from the determined start location is smaller than a first set value or on an uphill road on which the road average gradient is greater than a second set value.

14. The method according to claim 1, wherein the controller does not perform the step of operating an information provider and does not perform the step of controlling a creep torque of a driving motor on a downhill road on which road gradient of a start location is smaller than a third set value when the vehicle reaches the determined start location or on an uphill road on which the road gradient of the start location is greater than a fourth set value.

15. The method according to claim 1, wherein the controller does not perform the step of operating an information provider and does not perform the step of controlling a creep torque of a driving motor when the controller calculates a gradient difference between road gradient at the determined start location and road average gradient to the target location from the determined start location and an absolute value of the calculated gradient difference is greater than a fifth set value.

16. The method according to claim 1, wherein the controller does not perform the step of operating an information provider and does not perform the step of controlling a creep torque of a driving motor when a distance to the determined start location or a vehicle location at which the start location is determined, from the target location, is smaller than a sixth set value.

17. The method according to claim 16, wherein the sixth set value is determined according to the target vehicle speed in consideration of the road gradient and an event type.

18. The method according to claim 1, wherein the controller does not perform the step of determining target vehicle speed, does not perform the step of determining expected vehicle speed, does not perform the step of determining a start location, does not perform the step of operating an information provider, and does not perform the step of controlling a creep torque of a driving motor when current vehicle speed is less than a preset lower speed limit or greater than a preset upper speed limit during vehicle driving.

19. The method according to claim 1, wherein a maximum value and a minimum value of creep torque are preset in the controller, and
the step of controlling a creep torque of a driving motor comprises limiting the creep torque of the driving motor to the preset maximum value and minimum value.

20. The method according to claim 1, wherein the vehicle is a hybrid electric vehicle; and
wherein lock-up charging for charging a battery by a driving motor is prevented in a state in which an engine is turned on and in a state in which an engine clutch is locked up, in the step of controlling a creep torque of a driving motor by the controller.

* * * * *